Jan. 24, 1956   W. P. DALRYMPLE   2,732,051
CENTRIFUGAL CLUTCHES
Filed Aug. 1, 1951   4 Sheets-Sheet 1

INVENTOR.
William P. Dalrymple
BY Wallace and Cannon
ATTORNEYS

Jan. 24, 1956  W. P. DALRYMPLE  2,732,051
CENTRIFUGAL CLUTCHES
Filed Aug. 1, 1951  4 Sheets-Sheet 2

INVENTOR.
William P. Dalrymple
BY Wallace and Cannon
ATTORNEYS

Jan. 24, 1956
W. P. DALRYMPLE
2,732,051
CENTRIFUGAL CLUTCHES
Filed Aug. 1, 1951
4 Sheets-Sheet 3
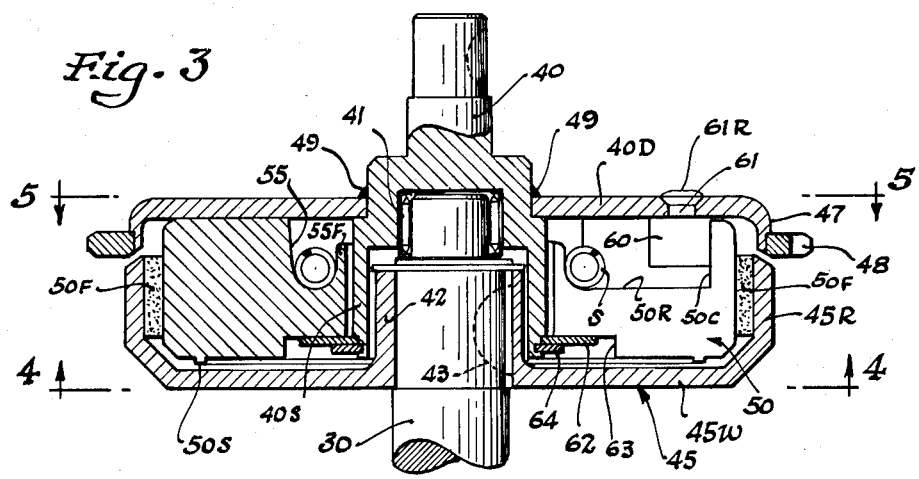
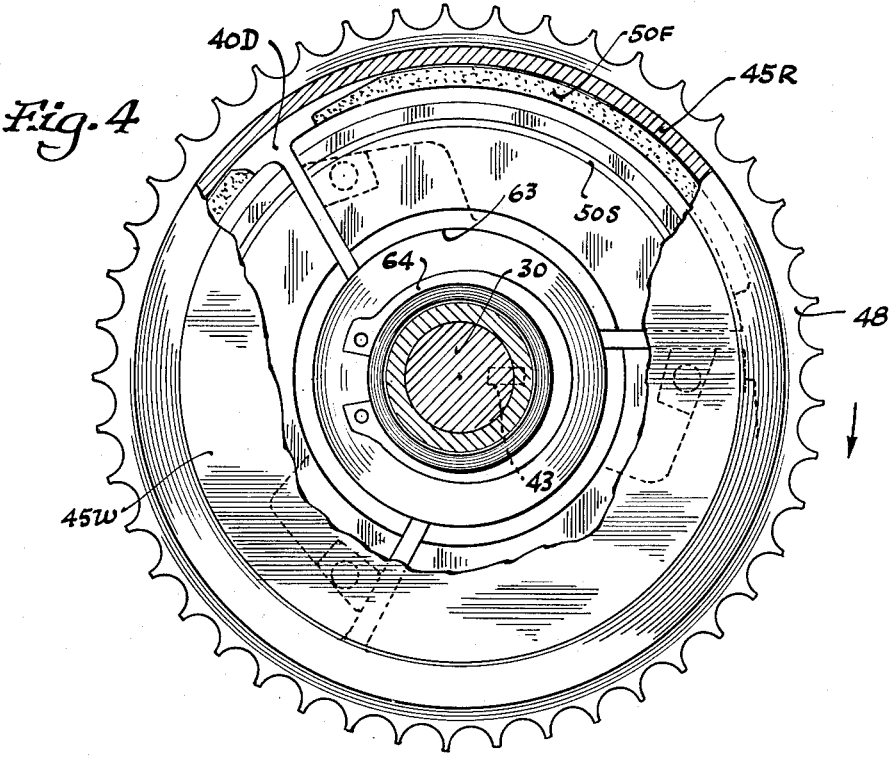
Inventor
William P. Dalrymple
By Wallace and Cannon
Attorneys

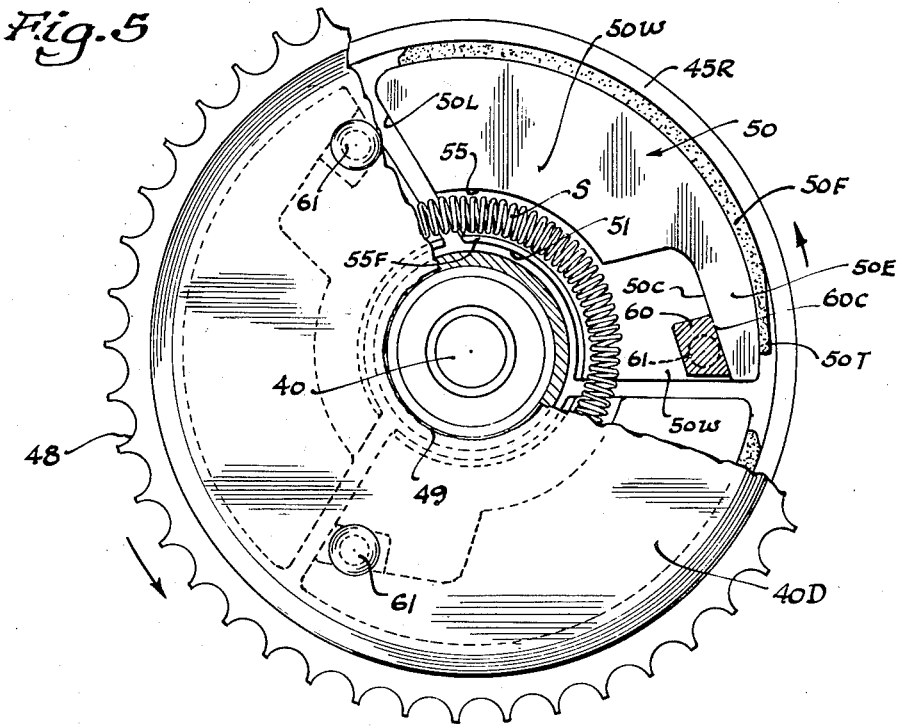
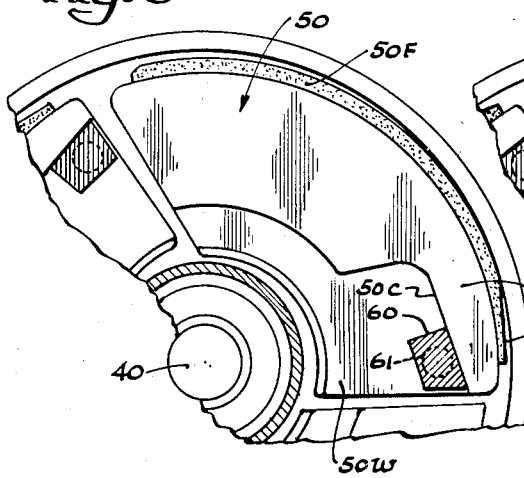
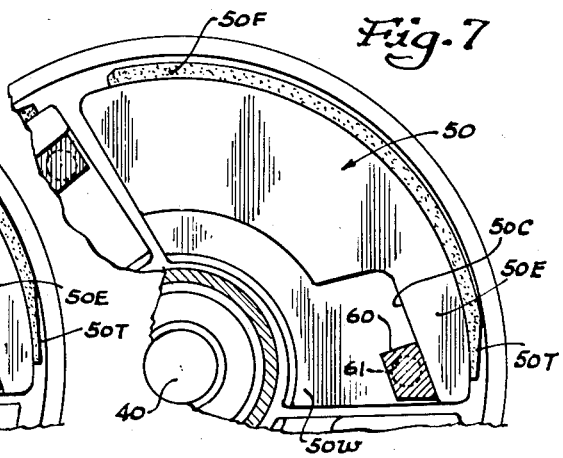

United States Patent Office 2,732,051  
Patented Jan. 24, 1956

2,732,051

CENTRIFUGAL CLUTCHES

William P. Dalrymple, Rochester, N. Y., assignor to American Brake Shoe Company, Wilmington, Del., a corporation of Delaware Application August 1, 1951, Serial No. 239,789

3 Claims. (Cl. 192—105)

This invention relates to clutch mechanisms and particularly to clutch mechanisms of the centrifugal type.

In my co-pending application, Serial No. 183,177, filed September 5, 1950, there is disclosed a power unit that is particularly adapted for use as the propulsion means for a wheeled vehicle such as a bicycle or tricycle or the like, and the centrifugal clutch of the present invention is adapted particularly for utilization as a part of a power transmission means that is afforded in association with power units of the general kind disclosed in my aforesaid co-pending application. The particular transmission in which the present clutch may be utilized advantageously is disclosed in my co-pending application, Serial No. 239,788, filed August 1, 1951, now patent 2,682,788, issued July 6, 1954.

As disclosed in my aforesaid co-pending applications, the power unit consists of a driving engine of the internal combustion type as well as clutch means and other power transmission elements, all arranged within the periphery of the wheel that is driven by such power unit, and by reason of such location of these elements of structure, the space limitations are found to be quite restricted, and among the important objects of the present invention, is the provision of a centrifugal clutch arrangement which is capable of satisfactory operation and performance within the space limitations such as those that are thus imposed. More particularly, it is an important object of the present invention to enable centrifugal clutches having a relatively high power transmitting capacity to be constituted in a relatively small diameter. Further and related objects are to enable contrifugal clutches to be constructed in a simple manner and to be capable of operation in an advantageous manner that not only attains smooth clutch engagement but which also enables the clutch to maintain a relatively high power transmitting capacity when the engine speed has been reduced to a relatively low point.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention, and the purview of the appended claims.

In the drawings:

Fig. 3 is a view taken in transverse cross-section and illustrating the clutch of the present invention;

Fig. 4 is a side elevational view taken partially in section substantially along the line 4—4 of Fig. 3;

Fig. 5 is a sectional view taken in the direction opposite from the direction in which Fig. 4 is taken, Fig. 5 being taken along the line 5—5 in Fig. 3; and Figs. 6 and 7 are fragmental views showing one of the clutch members in different positions.

Figure 1:
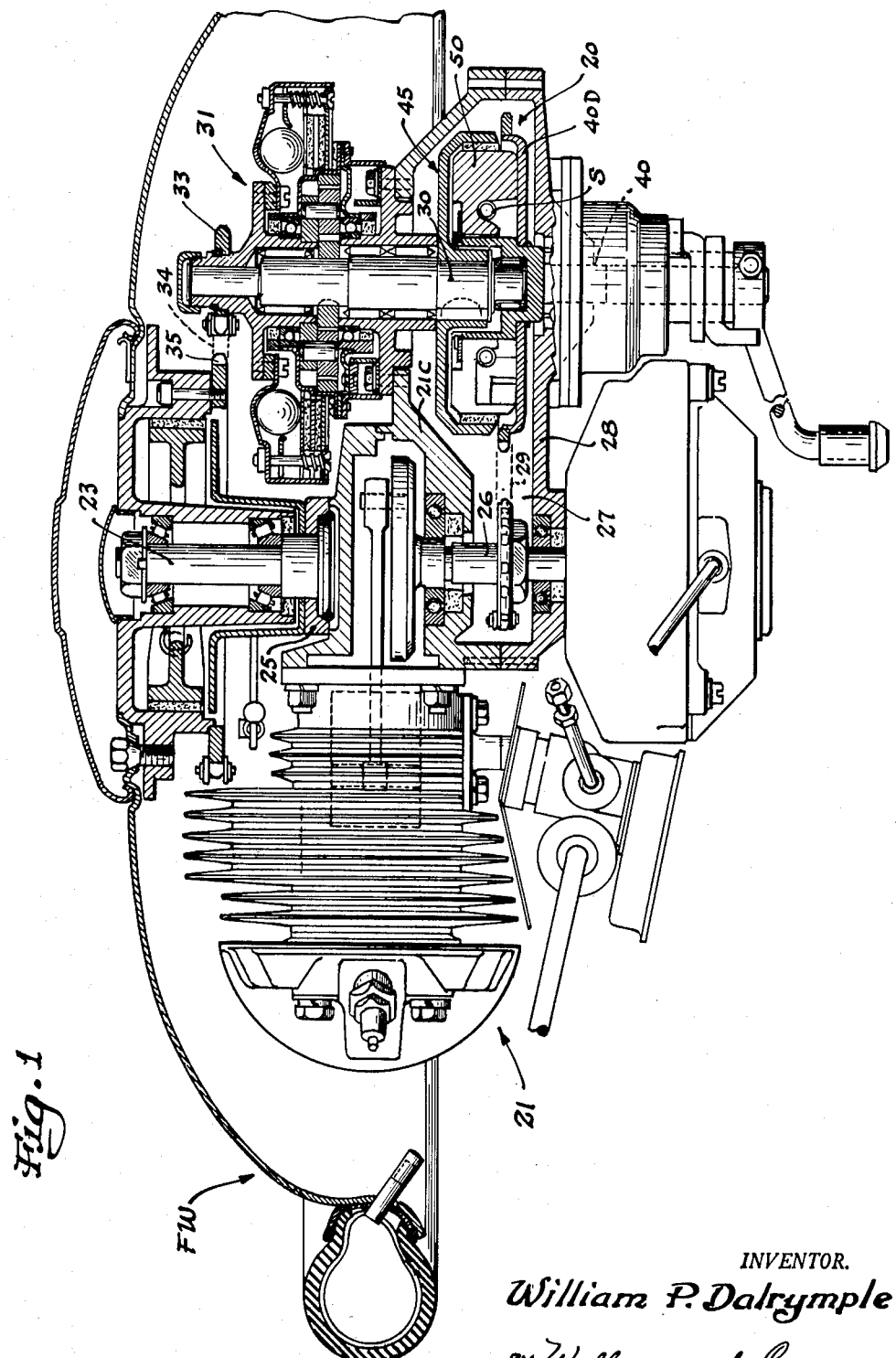
Fig. 1 is a horizontal sectional view taken through a power unit adapted for use with a tricycle or a bicycle, and embodying the clutch of the present invention in the power transmission means thereof.
Figure 2:
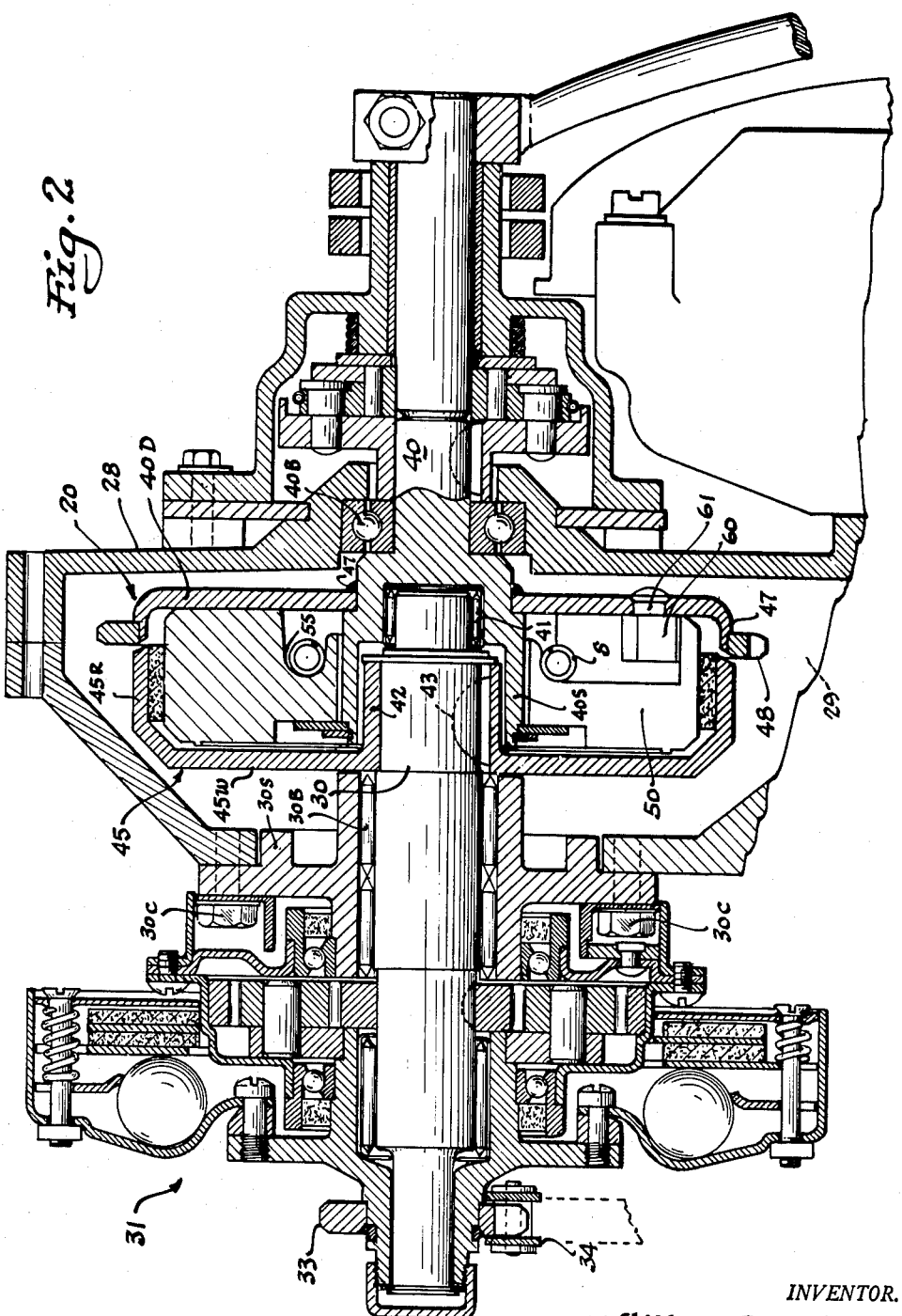
Fig. 2 is an enlarged horizontal sectional view of the power transmission and including the centrifugal clutch of the present invention.

For purposes of disclosure the invention is herein illustrated as embodied in a centrifugal clutch 20 that is shown in Figs. 1 and 2 as embodied in the transmission mechanism of a power unit 21. This power unit 21 is in many of its details like the power unit illustrated in my co-pending application, Serial No. 183,177, filed September 5, 1950, and reference may be had to such co-pending application for details of structure and arrangement of such power unit. It might be pointed out however, that the power unit 21 is utilized to drive a wheel such as the wheel FW, and as disclosed in my aforesaid co-pending application, this wheel FW is mounted on an axle 23 that is carried on a center strut 25, such center strut being mounted in the front steering column of a bicycle or tricycle. The axle 23 projects in one direction from the center strut 25 and the power unit 21 is mounted on the opposite side of the center strut 25, such mounting being effected by securing one side wall of the crank case 21C of the engine 21 to the center strut 25. The engine or power unit 21 is arranged to drive a crank shaft 26 that extends out of the other wall of the crank case and into a chamber 27 that is formed in a transmission housing 28, this transmission housing being carried upon the crank case 21C and extensions thereof. The clutch 20 of the present invention is housed within the transmission housing 28 and is driven from the crank shaft 26 by means including a chain drive 29 as will hereinafter be described.

The centrifugal clutch 20 of the present invention is arranged to drive an out-put shaft 30 which constitutes the power in-put element of a centrifugally controlled change-speed mechanism 31, the out-put element of which includes a sprocket 33, and this sprocket 33 is connected by a chain 34 to a sprocket 35 that is fixed to the wheel FW, thus to complete the drive between the engine 21 and the wheel FW. The change-speed mechanism 31 and its relationship and functioning in the complete transmission between the engine and the wheel FW are disclosed in detail in my aforesaid co-pending application, Serial No. 239,788, filed August 1, 1951, now patent 2,682,788 issued July 6, 1954.

The clutch 20 of the present invention is arranged to drive the stub shaft 30 as shown in Figs. 1 to 4, and the shaft 30 thus constitutes the driven element of the present clutch, the driving element being afforded by a stub shaft 40 that is mounted in the casing 28 in alignment with the driven shaft 30. As will be evident in Fig. 2 of the drawings, the driven shaft 30 is mounted on needle bearings 30B in the left-hand wall of the transmission housing 28, it being noted that this left-hand wall is afforded in part by an integral extension of one wall of the crank case 21C, and there being a separate bearing plate 30S secured in this integral wall by means such as cap screws 30C so as to afford an outer race for the needle bearing 30B.

The shaft 40 is mounted in the right-hand wall of the transmission housing 28 as shown in Fig. 2, by means such as a ball bearing 40B, and within the transmission housing 28, the shaft 40 is substantially enlarged to afford an outer race for a needle bearing 41 whereby the adjacent portions of the shafts 30 and 40 are associated for relative rotative movement. Just to the left of the needle bearing 41, the shaft 30 has a mounting sleeve 42 fixed thereon in a surrounding relation and keyed thereto by means of a key 43, and this sleeve 42 serves as the support for a clutch drum 45 which has a side wall 45W and an outer rim 45R. The enlarged portion of the shaft 40 has a sleeve portion 40S that extends further to the left as viewed in Fig. 2 so that it surrounds the sleeve 42, this sleeve 40S serves as a mounting for elements of the clutch mechanism, as will be described in detail hereinafter.

The driving shaft 40 of the clutch 20 has a driving plate 40D fixed thereon as by welding at 47 and this plate 40D has a flange 47 that is formed so as to extend for a short distance to the left, as viewed in Fig. 2 into close proximity to the edge of the rim 45 of the clutch drum 45, and about the edge of the flange 47, a sprocket 48 is fixed, this sprocket being the one that is driven by the chain connection 29 from the crank shaft of the motor 21. The plate 40D and the clutch drum 45 thus cooperating afford a substantially closed housing space for the friction means and the operating elements of the clutch 20.

Within the housing that is thus afforded, the clutch has a plurality of friction members 50 that are so formed as to have weight elements 50W integral therewith. In the present instance three such friction members 50 are afforded and these elements are so formed as to extend through somewhat less than 120° within the clutch drum 45. Along its outer arcuate face, each clutch member 50 is surfaced with a strip of friction material 50F that may be secured thereto in any preferred manner as by means of a suitable adhesive. The friction or clutch members 50 are formed at their inner surfaces to afford an arcuate face 51 that is disposed opposite the outer face of the sleeve 40S, and intermediate this arcuate surface 51 and the outer arcuate face upon which the friction material 50F is secured, the members 50 have a special configuration which adapts such members for the application of controlling forces thereto as will be hereinafter described. Thus in what may be termed the leading portions of each clutch member 50, the thickness of the clutch member is just slightly less than the distance between the plate 40D and the wall 45W as will be evident in Fig. 3 of the drawings, and on the faces of such members that are to be disposed adjacent to the plate 40D, an arcuate groove 55 is formed so as to be concentric with the arcuate inner and outer faces of the members 50. The formation of the arcuate groove 55 thus affords an arcuate flange 55F that is located adjacent to the sleeve 40S, and when the three clutch members 50 are in position within the clutch housing, these grooves 55 afford a substantially continuous annular space which receives a clutch control spring S. This clutch control spring S is in the nature of a continuous coiled spring that is contractile in character so that the action of this spring S upon the flanges 55F is to tend to draw the three clutch members 50 radially inwardly toward the sleeve 42. Thus the clutch members 50 tend to be normally separated from or disengaged with respect to the rim 45R, and these clutch members are caused to engage the rim 45R by the action of centrifugal force as the speed of the driving shaft 40 is increased. In such engagement of the clutch members, the movements of the clutch members 50 are so controlled as to produce smooth engagement, and after engagement of the clutch, the clutch members 50 are so controlled under the present invention that they will retain their drive transmitting relationship even though the speed of the driving shaft 40 is subsequently reduced to a substantial extent.

To attain such operation and control of the clutch members 50, these clutch members are cut away near their trailing edges and outwardly of the groove 55 so as to afford a rearwardly extending arm or extension 50E that has an inwardly facing cam surface 50C that extends for a substantial distance to the trailing edge extension 50E of the clutch member. As will be evident in Fig. 3 of the drawings, such formation of the cam surface 50C results in the formation of a substantial recess 50R in this trailing portion of the clutch member 50, and this recess 50R extends to a point spaced from the opposite face of the member, there being a segmental web 50W at such opposite face which extends from the extension 50E inwardly to the arcuate flange 55R. Because of this cut-out or recess 50R the center of gravity of each clutch member 50 is displaced in a forward or leading direction from the physical midpoint of such clutch elements. Each cam surface 50C is arranged to bear inwardly against an outer surface 60C of a control block or abutment 60 that is carried on the plate 40D. Three such control blocks 60 are mounted on the plate 40D at equally spaced points circumferentially thereof and this mounting is afforded in each case by a stud 61 formed integrally with the block 60 and extended through the plate 40D and riveted as at 61R. Thus the blocks 60 may rock slightly about the axis of their studs 61 as required in the movements of the clutch members 50 as will now be described.

When the clutch 20 is disengaged, all of the clutch members 50 occupy a position substantially like that shown in Fig. 7 in which the arcuate surface of the friction lining 50F is disengaged from the rim 45R, and the leading end edges 50L of the respective clutch members 50 are located adjacent to or in contact with the adjacent radial edges of the blocks 60. In this condition, the arcuate surface 51 of each clutch member 50 is disposed relatively close to the surface of the sleeve 42.

The form of the cam surface 50C and its relationship to the arcuate surface of the brake lining 50F constitutes an important aspect of the present structure, and in this respect it is to be noted that the cam surface 50C has a slope such that its leading end is spaced closer to the central axis of the clutch than the other or trailing end of such cam surface. Among other things, this slope compensates for the progressive wear of the brake lining 50F, and as the brake lining 50F wears, the block 60 will, in the engaged relation of the clutch, move progressively further in an advancing direction along the surface 50C. The length of the cam surface 50C is, therefore, coordinated with the slope of this cam surface so that the block 60 may thus have a range along the surface 50C sufficient to compensate for the amount of allowable wear of the friction material 50F.

An aspect of the structure that is related to the slope of the cam surface 50C is the form of the trailing edge of the brake lining 50F, it being noted that this trailing edge is relieved along an angular plane as at 50T so that throughout the entire length or range of the cam surface 50C, as this cam surface cooperates with the block 60, the clutch member 50 may be rocked about the axis of the block 60 without causing increased binding of the friction material 50F in respect to the clutch drum 45.

When the driving shaft 40 is started, the clutch members 50 will remain in the disengaged position of Fig. 7 so long as the shaft 40 is maintained at a low speed. In this respect it should be observed that the weights or clutch members 50 are in effect carried on sleeve 40S of the driving shaft 40 and on the plate 40D. These members are held against lateral dragging movement with respect to the wall 45W of the clutch drum 45R by a relatively large retaining washer 62 that engages the side surface of the several clutch members 50 within a recess 63. This washer 62 surrounds the end of the sleeve 40S and is held in position thereon by a resilient retaining ring 64 that is engaged in a suitable annular slot in the end portion of the sleeve 40S. In the event that the retaining action of the washer 62 is ineffective in this respect, it is desirable to prevent undue frictional contact of the side surfaces of the members 50 with the wall 45W, and for this purpose relatively narrow arcuate ribs 50S are provided on the surfaces of the clutch members 50 adjacent to the wall 45W. The lugs or blocks 60 also serve in locating the clutch members 50 on and with respect to the driving plate 40D, and thus the several clutch members 50 are rotated with the driving shaft 40 in the direction indicated by the arrow in Fig. 5.

When the speed of the driving shaft 40 is increased above an idling speed to a lower operating speed of, for example, 300 to 350 R. P. M. the centrifugal force acting on the clutch members 50 becomes sufficient to overcome the action of the spring 60, and the clutch members 50 move outwardly, particularly adjacent to the leading ends thereof, it being recalled that the center of gravity of each clutch member 50 is displaced in the leading direction from the physical center or midpoint of such clutch member. As soon as contact is made between the clutch drum 45R and any point on the friction material 50F the clutch drum 45 acts to produce a drag or retarding action upon the clutch member 50, and the clutch member is shifted in a relatively reverse direction from the relationship shown in Fig. 6 to the relationship shown in Fig. 5. In other words there is a generally circumferential displacement of the clutch member with relation to the block 60, the cam surface 50C moving along the opposed cam surface 60C of the block 60, and this serves with a wedging action to hold the trailing portions of the friction member 50F in engagement with the clutch drum 45R. The engaged relationship of the clutch members 50 with respect to the clutch drum 45R is maintained, when under load, even though the rotative speed of the driving shaft 40 is reduced somewhat below the speed at which clutch engagement took place, and this result follows from the action of the blocks 60 and the cam surface 50C upon the trailing end portions of the clutch members 50. However, when the speed of the driving shaft 40 has been reduced to a point somewhat below the point at which the clutch engagement took place, the spring S overcomes or partially overcomes the centrifugal forces acting on the clutch members 50 and the leading end portions of these clutch members are shifted radially inwardly as indicated in Fig. 6 of the drawings. It should be noted of course that as such shifting of the clutch members takes place, there is a rocking movement about the axis of the stud 61 in each instance, and the friction material 50F is disengaged from the clutch drum 45 throughout substantially its entire length. Such rocking movement of the clutch members 50 is made possible by the relieving of the trailing end corner of the friction material 50F at 50T, Fig. 5, so that the most trailing point of engagement of the friction member 50F with the clutch drum 45 is under all conditions of wear, substantially on, or displaced in a leading direction from a line passing through the axis of the shaft 40 and the stud 61. Thus in such rocking of the member 50, there is no further wedging action between the block 60 and the drum 45R. When the friction lining 50F has been disengaged with respect to the drum 45R, the drag on the members 50 is reduced to such an extent that the action of the spring S is sufficiently strong to induce some endwise or circumferential shifting of the clutch members 50 in a leading direction until the leading edges 50L of the clutch members are located adjacent to the respective blocks 60 as shown in Fig. 7 of the drawings.

From the foregoing description it will be evident that the present invention affords a centrifugal clutch mechanism that is adapted for improved and advantageous operation, and that this clutch mechanism is particularly adapted for operation under relatively heavy loads and for construction in relatively small sizes. It will also be evident that the present invention enables centrifugal clutches to be so constructed and arranged that the effective clutch engagement may be maintained even when the speed of operation of the clutch is reduced substantially below the original engaging speed.

Thus while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a centrifugal clutch, a driving member and a driven member, a plate connected to the driving member, a plate connected to the driven member, said plates together defining a clutch housing, a flange on the second-named plate affording a clutch drum, a plurality of centrifugally actuatable clutch segments disassociated one from the other within said clutch housing, a spring within said clutch housing normally holding the clutch segments on the driving member in non-engaged relation with respect to said clutch drum, each of said clutch segments being formed at the trailing end with a relatively large recess displacing the center of gravity of each clutch segment substantially forwardly of the physical center thereof, each of said recesses affording a radially inwardly facing and inclined cam surface, and wedge acting blocks pivotally carried by the first-named plate within said recesses in position to bear against the corresponding cam surfaces on the clutch segments normally leaving exposed a substantial portion of said recesses forwardly of the blocks whereby, when the driving member accelerates to clutch engaging speed, said clutch segments first pivot independently of one another at their leading ends radially outwardly about said blocks until portions thereof engage said clutch drum whereupon rotative movement of the clutch segments is retarded causing the cam surfaces on the clutch segments to independently advance along said blocks serving to wedge each of the clutch segments gradually into engagement with the clutch drum from the leading end of the clutch segments rearwardly to the trailing ends thereof.

2. In a centrifugal clutch adapted to couple a driving member to a driven member, a driving plate and a driven plate together defining a clutch housing, an annular flange on the driven plate affording a clutch drum, a plurality of centrifugally actuatable clutch segments disassociated one from the other and arranged within said clutch housing to rotate with the driving member, a spring within said clutch housing normally holding the clutch segments radially inwardly in non-engaged relation with respect to said clutch drum, each of said clutch segments being formed at the trailing end with a relatively large recess displacing the center of gravity of each clutch segment substantially forwardly of the physical center thereof, each of said recesses affording a radially inwardly facing and inclined cam surface, and wedge acting blocks pivotally carried by the first-named plate within said recesses in position to bear against the corresponding cam surfaces on the clutch segments normally leaving exposed a substantial portion of said recesses forwardly of the blocks whereby, when the driving member accelerates to clutch engaging speed, said clutch segments first pivot independently of one another at their leading ends radially outwardly about said blocks until portions thereof engage said clutch drum whereupon rotative movement of the clutch segments is retarded causing the cam surfaces on the clutch segments to independently advance along said blocks serving to wedge each of the clutch segments gradually into engagement with the clutch drum from the leading end of the clutch segments rearwardly to the trailing ends thereof.

3. In a centrifugal clutch adapted to couple a driving member to a driven member, a driving plate and a driven plate together defining a clutch housing, an annular flange on the driven plate affording a clutch drum, a plurality of centrifugally actuatable clutch segments disassociated one from the other and arranged about an extension of the driving member within said clutch housing to rotate with the driving member, arcuate slots formed in one side of the clutch segments to register circumferentially one with the other, an annular coil spring arranged in said arcuate slots to normally hold the clutch segments radially inwardly in non-engaged relation with respect to said clutch drum, each of said clutch segments being formed at the trailing end with a relatively large recess displacing the center of gravity of each clutch segment substantially forwardly of the physical center thereof, each of said recesses affording a radially inwardly facing and inclined cam surface, and wedge acting blocks pivotally carried by the first-named plate within said recesses in position to bear against the corresponding cam surfaces on the clutch segments normally leaving exposed a substantial portion of said recesses forwardly of the blocks whereby, when the driving member accelerates to clutch engaging speed, said clutch segments first pivot independently of one another at their leading ends radially outwardly about said blocks until portions thereof engage said clutch drum whereupon rotative movement of the clutch segments is retarded causing the cam surfaces on the clutch segments to independently advance along said blocks serving to wedge each of the clutch segments gradually into engagement with the clutch drum from the leading end of the clutch segments rearwardly to the trailing ends thereof.

References Cited in the file of this patent

UNITED STATES PATENTS

| | | |
|---|---|---|
| 1,873,561 | Else et al. | Aug. 23, 1932 |
| 2,058,736 | Stauffer et al. | Oct. 27, 1936 |
| 2,382,228 | Howell | Aug. 14, 1945 |
| 2,455,086 | Papas | Nov. 30, 1948 |
| 2,465,701 | Wachs | Mar. 29, 1949 |
| 2,504,177 | Bruestle | Apr. 18, 1950 |
| 2,529,919 | Cunningham | Nov. 14, 1950 |
| 2,552,747 | Strimple et al. | May 15, 1951 |

FOREIGN PATENTS

| | | |
|---|---|---|
| 886,762 | France | Oct. 25, 1943 |
| 767,258 | France | July 13, 1934 |